US012783066B2

(12) United States Patent
Amano

(10) Patent No.: US 12,783,066 B2
(45) Date of Patent: Nov. 3, 2026

(54) INPUT DEVICE

(71) Applicant: ALPS ALPINE CO., LTD., Tokyo (JP)

(72) Inventor: Takashi Amano, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/883,293

(22) Filed: Sep. 12, 2024

(65) Prior Publication Data

US 2025/0123699 A1 Apr. 17, 2025

(30) Foreign Application Priority Data

Oct. 13, 2023 (JP) ................................ 2023-177720

(51) Int. Cl.

*G06F 3/0362* (2013.01)
*G06F 3/039* (2013.01)
*G06F 3/044* (2006.01)

(52) U.S. Cl.

CPC .......... *G06F 3/0362* (2013.01); *G06F 3/0393* (2019.05); *G06F 3/044* (2013.01)

(58) Field of Classification Search

None

See application file for complete search history.

(56) References Cited

U.S. PATENT DOCUMENTS 10,921,913 B1 * 2/2021 Fong ..................... H01H 19/08
11,366,575 B2 6/2022 Shiga
11,579,665 B2 2/2023 Hinson et al.
2018/0024649 A1 * 1/2018 Uno ...................... G06F 3/0338 345/174
2019/0391672 A1 12/2019 Fischer et al.
2020/0073487 A1 * 3/2020 Ballan .................. G06F 3/0362
2022/0019297 A1 * 1/2022 Su .......................... G06F 3/041
2023/0004237 A1 1/2023 Kara et al.
2025/0105404 A1 * 3/2025 Jeong ................. H01M 50/557

FOREIGN PATENT DOCUMENTS

JP 2021-120782 8/2021
JP 7003225 1/2022
JP 2022-544231 10/2022
WO 2019/180774 9/2019

OTHER PUBLICATIONS

Extended European Search Report for 24205000.3 mailed on Feb. 17, 2025.

* cited by examiner

*Primary Examiner* — Christopher R Lamb
(74) *Attorney, Agent, or Firm* — IPUSA, PLLC

(57) ABSTRACT

A knob of a KoD includes a fixed part attached to a touch sensor or a cover glass via an adhesive, a rotating part rotatably attached to the fixed part via a rotating shaft, and a conductor provided inside the rotating part. Low-permittivity members corresponding in number to the number of steps are provided at equal intervals on a bottom surface of the fixed part. When the knob is rotated, the rotation angle of the knob is detected based on a change in the capacitance caused by a low-permittivity member.

6 Claims, 9 Drawing Sheets

PLAN VIEW

SIDE VIEW

ROTATION OPERATION

| | | |
|---|---|---|
| DETERMINATION THAT ROTATIONAL MOVE IS PERFORMED IS SET TO BE MADE UPON 72° -ROTATION | DETERMINATION THAT ROTATIONAL MOVE IS PERFORMED IS SET TO BE MADE UPON 36° -ROTATION | DETERMINATION THAT ROTATIONAL MOVE IS PERFORMED IS SET TO BE MADE UPON 18° -ROTATION |

INPUT DEVICE

CROSS-REFERENCE TO RELATED APPLICATION

The present application claims priority under 35 U.S.C. § 119 to Japanese Patent Application No. 2023-177720, filed Oct. 13, 2023, the contents of which are incorporated herein by reference in their entireties.

BACKGROUND OF THE INVENTION

Field of the Invention

The present invention relates to an input device having a human-machine interface function, and more particularly to an input device including a touch panel and an operating element.

Description of the Related Art

Practical application of a Knob on Display (KoD) including buttons and knobs on a cover glass of a capacitance-type touch panel display is in progress (for example, Japanese Patent Application Laid-Open Publication No. 2021-120782). For example, as illustrated in FIG. 1A, a knob 20 is attached to the surface of a touch panel 10. The knob 20 is an operating element having a rotation mechanism like a mechanical switch, and as illustrated in FIG. 1C, a user rotates the knob 20 with fingers F to enter the amount of rotation.

The KoD disclosed by Japanese Translation of PCT International Application Publication No. 2022-544231 includes a push electrode pad and a rotary electrode pad on the bottom side of a main body made of an electrically insulating material (for example, acrylic) or the like, and these electrodes are rotatably fixed close to a touch screen. The position and the angle of the KoD, and/or button depression via the KoD are detected by a control circuit (e.g., a microcontroller) via a touch sensor panel.

In the KoD of Japanese Patent No. 7003225, a substantially cylindrical knob includes a hollow portion, and three conductive columns are provided inside the knob. The three conductive columns are detected as three touch points on a touch panel while the knob is positioned on the display area of the display.

FIGS. 2A and 2B are schematic cross-sectional views illustrating an example of the rotating mechanism of a knob of a KoD. A cover glass 32 is situated on a touch sensor 30, and a knob 20 includes a cylindrical fixed part 40 fixed by an adhesive 34 on the cover glass 32, and a cylindrical rotating part 60 attached to the fixed part 40 via a shaft 50. In order to detect the rotation of the rotating part 60, a conductor 70 as illustrated in FIG. 2B is provided inside the rotating part 60. For touch detection when the knob 20 is pinched, the touch sensor 30 detects presence or absence of a touch on the knob's side surface and the finger positions on the knob's outer periphery based on a conductive path K to the touch sensor 30 through the conductor 70.

SUMMARY OF THE INVENTION

A knob of a KoD can be installed as a retrofitting part, and is excellent in customizability such as changing the installation position on the touch panel or replacing the knob itself with another one having a different design. Further, in order to provide feedback for the presence or absence of rotation and the amount of rotation, a mechanism is provided for generating a click feeling when the knob 20 is rotated from the state illustrated in FIG. 3A to the state illustrated in FIG. 3B.

Owing to the customizability of the KoDs, it is assumed that a knob may be replaced with a variety of knobs depending on the vehicle types or users' preferences. In this case, the rotation angle (resolution) until the feedback by the click feeling described above is generated may vary depending on the type of the knob. For example, as illustrated in FIG. 4, in a case of generating clicking over 5 steps per full rotation of the knob, a calculation unit is set to determine that a rotational move is performed in response to the knob being rotated by 72 degrees as the rotation angle of 1 step. The calculation unit is set to determine that a rotational move is performed, by regarding that the rotation angle of 1 step is 36 degrees in a case of 10 steps, and that the rotation angle of 1 step is 18 degrees in a case of 20 steps.

It is necessary to change the rotation determination setting of the rotation detection algorithm packed in the calculation unit side of the product at every installation of a knob having a different rotation angle, which impairs customizability by imposing a burden on the replacement of the knobs. As can be appreciated from what has been described, there is a need for a method that can perform rotation determination without resetting the rotation angle when a knob having a different number of steps, that is, a knob requiring a different rotation angle to be detected per one rotational move, is substituted.

An object of the present invention is to provide an input device that can adapt to operating elements varied in the rotation angle to be detected per one rotational move.

An input device according to the present invention includes: a capacitance-type touch sensor; an operating element rotatably mounted on the touch sensor, the operating element including at least one conductor thereinside, the conductor being able to capacitively couple to the touch sensor and configured to rotate when the operating element is rotated, and the operating element further including a plurality of capacitance changing parts in a space overlapping a region where the conductor rotationally moves; and a detection means configured to detect a rotation angle of the operating element based on a change in capacitance in the capacitance changing parts when the operating element is rotated.

In an aspect, the plurality of capacitance changing parts are arranged at intervals corresponding to the rotation angle to be detected per one rotational move. In an aspect, the capacitance changing parts are insulating members provided to the operating element. In an aspect, the insulating members are made of a material having a permittivity lower than that of the operating element. In an aspect, the capacitance changing parts are regions of the operating element that are changed in a thickness in a direction toward the touch sensor. In an embodiment, the operating element includes a fixed part fixed on the touch sensor and a rotating part rotatably attached to the fixed part, and the capacitance changing parts are situated on the fixed part. In an embodiment, the capacitance changing parts are situated on a bottom surface of the fixed part.

According to the present invention, since a plurality of capacitance changing parts are provided in a region where the conductor of the operating elements rotationally moves, the rotation angle of the operating element can be detected based on a change in capacitance in the capacitance changing parts. Therefore, even when an operating element requiring a different rotation angle to be detected per one rotational move is attached, it is possible to automatically detect a rotation angle of the operating element without changing the rotation angle detection setting on the calculation unit side.

DETAILED DESCRIPTION OF THE DISCLOSURE

An embodiment of the present invention will now be described. An input device according to the present invention provides an input interface between a human and a machine for a KoD mounted on a display including a capacitance-type touch panel (touch sensor). The KoD can be detachably mounted at any position on the display, and the shape, size, number and the like of the KoD are not particularly limited.

Figure 1A:
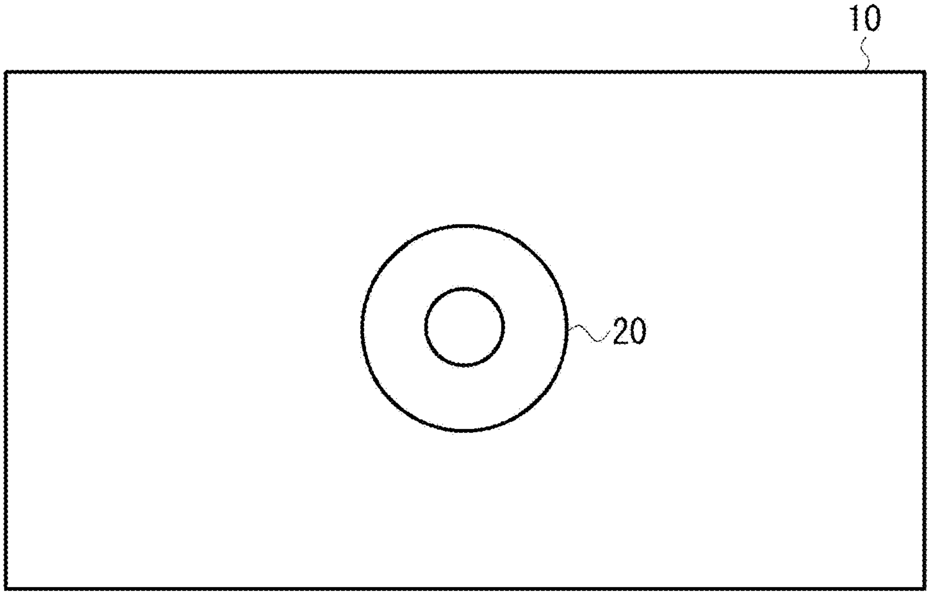
FIG.1A PRIOR ART
FIG. 1A is a view exemplarily illustrating the entire configuration of an existing knob on display.
Figure 1B:
FIG.1B PRIOR ART
FIG. 1B is a view exemplarily illustrating the entire configuration of an existing knob on display.
Figure 1C:
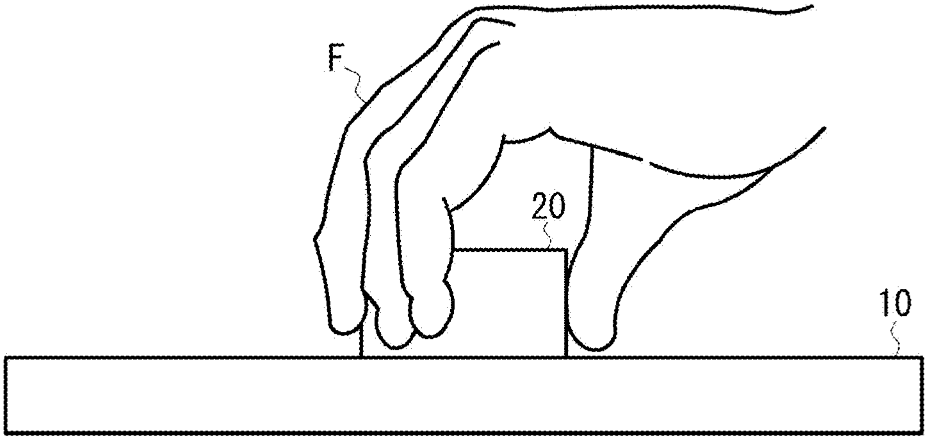
FIG.1C PRIOR ART
FIG. 1C is a view exemplarily illustrating the entire configuration of an existing knob on display.
Figure 2A:
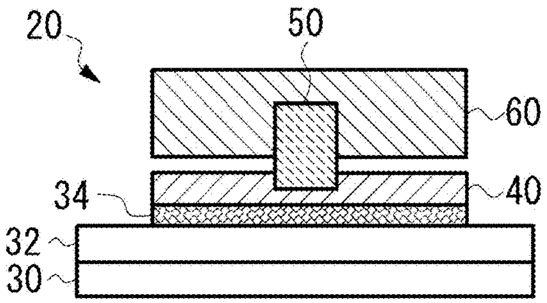
FIG.2A PRIOR ART
FIG. 2A is a schematic cross-sectional view illustrating an example of a knob rotation mechanism.
Figure 2B:
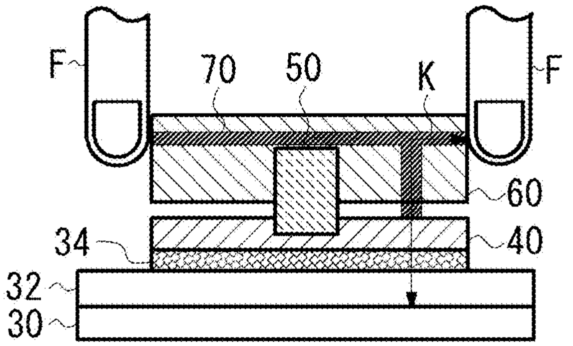
FIG.2B PRIOR ART
FIG. 2B is a schematic cross-sectional view illustrating an example of a knob rotation mechanism.
Figure 3A:
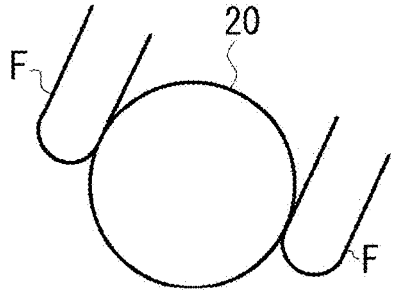
FIG.3A PRIOR ART
FIG. 3A is a view illustrating a click feeling when a knob is rotated.
Figure 3B:
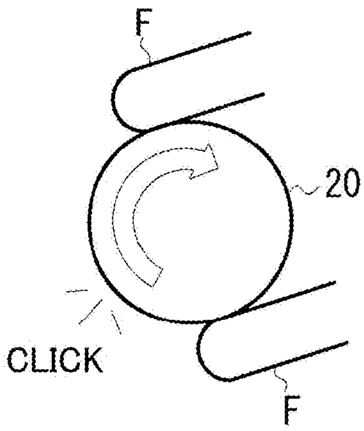
FIG.3B PRIOR ART
FIG. 3B is a view illustrating a click feeling when a knob is rotated.
Figure 4:
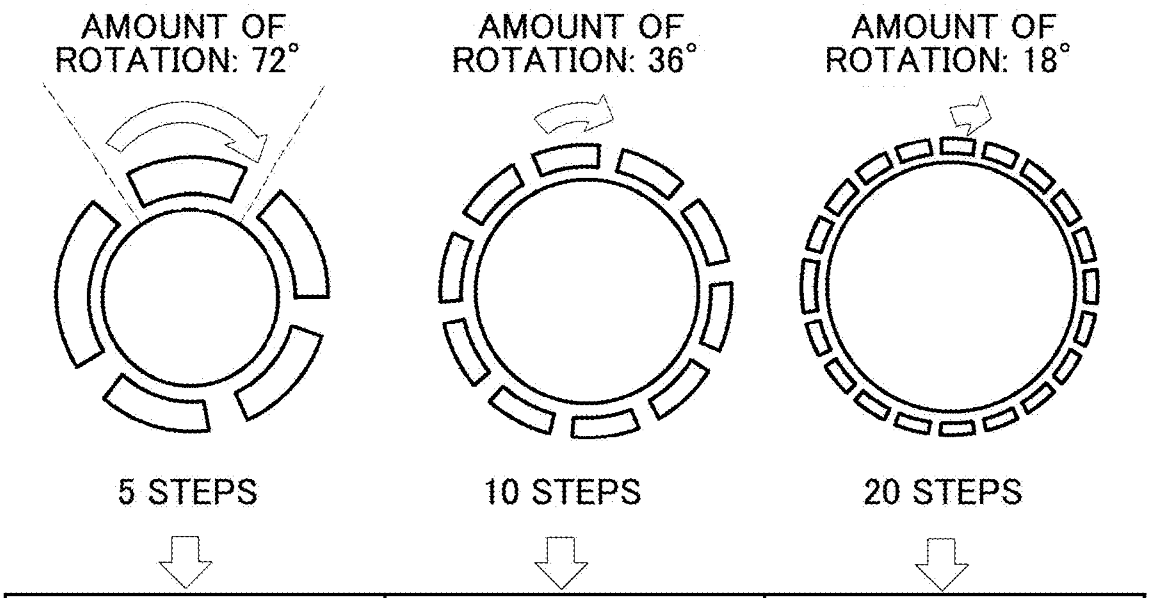
FIG.4 PRIOR ART
FIG. 4 is a diagram illustrating the problem of the existing KoD.
Figure 5A:
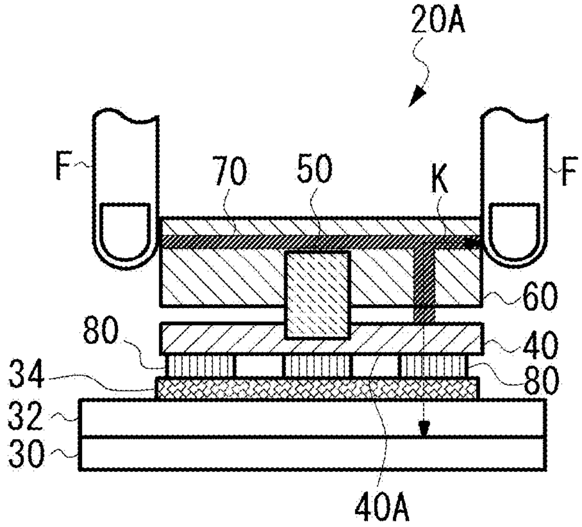
FIG. 5A is an exemplary longitudinal cross-sectional view of a knob according to a first embodiment of the present invention.
Figure 5B:
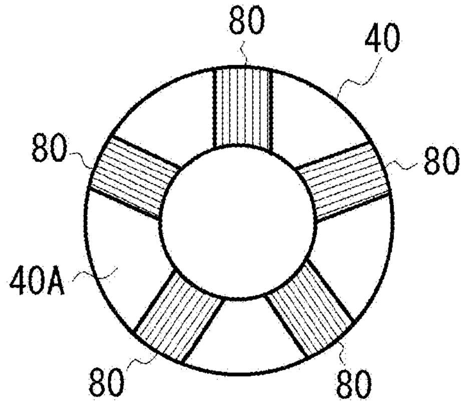
FIG. 5B is a plan view of the knob as viewed from the bottom.

FIG. 5A is a schematic longitudinal cross-sectional view of a knob according to the first embodiment of the present invention, and FIG. 5B is a plan view of the knob when viewed from the bottom. The same reference numerals are used for any components that are the same as those in FIGS. 2A and 2B.

A knob 20A according to the first embodiment is attached to any position on a touch panel including a touch sensor 30 and a cover glass 32 using an adhesive 34 or the like. The knob 20A includes a cylindrical fixed part 40 and a cylindrical rotating part 60 rotatably attached to the fixed part 40 via a shaft 50. A plurality of low-permittivity members 80 are attached to the bottom surface of the fixed part 40, and the plurality of low-permittivity members 80 are fixed to the cover glass 32 via the adhesive 34.

The fixed part 40 and the rotating part 60 are made of an electrically insulating material, and, for example, a metal conductor 70 is provided inside the rotating part 60. The conductor 70 is situated inside the rotating part 60 so as to be able to capacitively couple to the touch sensor 30. The conductor 70 includes, for example, a thin plate-like circular part having a diameter approximately equal to the diameter of the rotating part 60, and a columnar part extending in the vertical direction from a part of the thin plate-like circular part, with the tip of the columnar part touching or approaching the surface of the fixed part 40 beyond the bottom surface of the rotating part 60. When the rotating part 60 is rotated about the shaft 50, the conductor 70 also rotates together, and the tip of the conductor 70 moves as if drawing an arc on the surface of the fixed part 40. When the user pinches the knob 20A by the side surface with his/her fingers F, a conductive path K between the fingers F and the conductor 70 is formed, and the touch sensor 30 detects presence or absence of a touch on the knob and rotation of the knob based on a change in the capacitance in the conductive path where the conductor 70 is located.

In the first embodiment, the plurality of low-permittivity members 80 are attached to a bottom surface 40A of the fixed part 40 at equal intervals in accordance with the number of steps of the knob 20A, that is, the rotation angle to be detected per one rotational move of the knob. The low-permittivity members 80 are attached in a space overlapping a circumferential region where the tip of the conductor 70 rotationally moves. The low-permittivity members 80, in some embodiments, are made of a material having a permittivity lower than that of the fixed part 40, and, for example, such type of an insulating sheet is pasted on the bottom surface 40A of the fixed part 40.

In the example of FIGS. 5A and 5B, the number of steps of the knob 20A is five (the rotation angle to be detected per one rotational move is 72°), and, correspondingly, five low-permittivity members 80 are pasted equally at intervals of 72 degrees about the shaft 50. The shape and size of the low-permittivity members 80 are not particularly limited, but, for example, rectangular insulating sheets of the same size are pasted radially on the bottom surface 40A, and the insulating sheets are positioned so as to overlap the region where the tip of the conductor 70 moves in the circumferential direction.

The capacitance on the conductive path that is to be detected when the tip of the conductor 70 is positioned on a low-permittivity member 80 is different from the capacitance that is to be detected when it is positioned on none. For example, when the tip of the conductor 70 is positioned on a low-permittivity member 80, the capacitance on the conductive path that is to be detected is relatively low. When it is not positioned on any low-permittivity member 80, the capacitance on the conductive path that is to be detected is relatively high.

Although the low-permittivity members 80 are provided in the above example, this is non-limiting. As long as a change in the capacitance can be detected, a material having a permittivity lower than that of the fixed part 40 does not need to be used, and, for example, a material having a permittivity higher than that of the fixed part 40 may be used. Further, in the above example, the rectangular low-permittivity members 80 are attached. However, as long as a change in the capacitance can be detected, the planar shape thereof may be desirably selected. Further, in a case of pasting an insulating sheet as the low-permittivity members 80, a plurality of insulating sheets may be laminated.

By providing the knob 20A with the low-permittivity members 80 corresponding in number to the rotation angle to be detected per one rotational move, it is possible to cause the capacitance value, which is detected when the knob 20A is operated to rotate, to increase or decrease (in the example illustrated in FIGS. 5A and 5B, the capacitance value increases or decreases five times during one full rotation), and to determine whether the knob 20A has rotated by one step or not by a calculation unit observing the capacitance change.

Figure 6A:
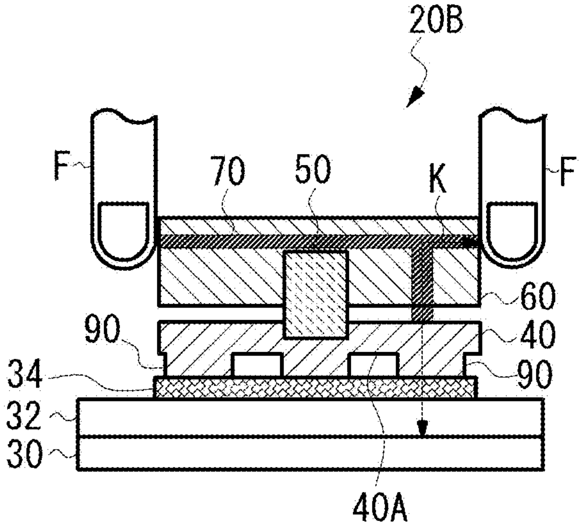
FIG. 6A is a schematic longitudinal cross-sectional view of a knob according to a second embodiment of the present invention.
Figure 6B:
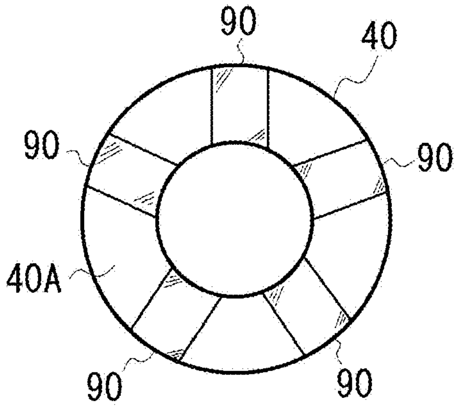
FIG. 6B is a plan view of the knob as viewed from the bottom.

FIG. 6A is a schematic longitudinal cross-sectional view of a knob according to a second embodiment of the present invention, and FIG. 6B is a plan view of the knob as viewed from the bottom. The same reference numerals are used for any components that are the same as those in FIGS. 2A and 2B. In the second embodiment, instead of attaching the low-permittivity members 80 as in the first embodiment, the thickness of the fixed part 40 is changed to provide a distance to the touch sensor 30, to cause a change in the electrical capacitance of the fixed part 40.

In the example of FIGS. 6A and 6B, in order to make the thickness of the fixed part 40 relatively large, a plurality of protrusions 90 corresponding to the number of steps are provided on the bottom surface 40A. The number of steps of the knob 20B illustrated here is five, and the corresponding five protrusions 90 are uniformly formed at intervals of 72 degrees about a rotation shaft. The protrusions 90 are formed, for example, as a result of forming grooves having a certain depth in regions other than the protrusions of the fixed part 40. The shape and size of the protrusions 90 are not particularly limited, but, for example, as illustrated in the drawing, rectangular protrusions 90 having the same size are formed radially on the bottom surface 40A, and the protrusions 90 are positioned so as to overlap a circumferential region where the tip of the conductor 70 rotationally moves.

The capacitance on the conductive path that is to be detected when the tip of the conductor 70 is positioned on a protrusion 90 is different from the capacitance that is to be detected when it is positioned on none. For example, when the tip of the conductor 70 is positioned on a protrusion 90, the capacitance on the conductive path that is to be detected is relatively low. When it is not positioned on any protrusion 90, the capacitance on the conductive path that is to be detected is relatively high. The thickness of the protrusions 90 is appropriately selected to a value at which a change in the capacitance can be detected.

Although the protrusions 90 are provided in the above example, the present invention is not limited to this, and recesses may be provided to reduce the thickness of the fixed part 40. In this case, a fixed part 40 having a constant thickness is prepared, and recesses are formed by forming grooves in the fixed part 40. The technical function of the recesses is equivalent to that of the protrusions 90, and the recesses change the capacitance depending on whether the tip of the conductor 70 is on the recesses or not.

Further, the first embodiment and the second embodiment may be combined to change the capacitance. For example, the low-permittivity members 80 may be pasted on the protrusions 90 of the fixed part 40.

Thus, when the knob is replaced with a knob having a different number of steps and requiring a different rotation angle to be detected per one rotational move, the computing unit side can determine a rotational move of the knob corresponding to one step only by observing the capacitance value without changing the setting of the rotation angle to be detected every time.

Figure 7:
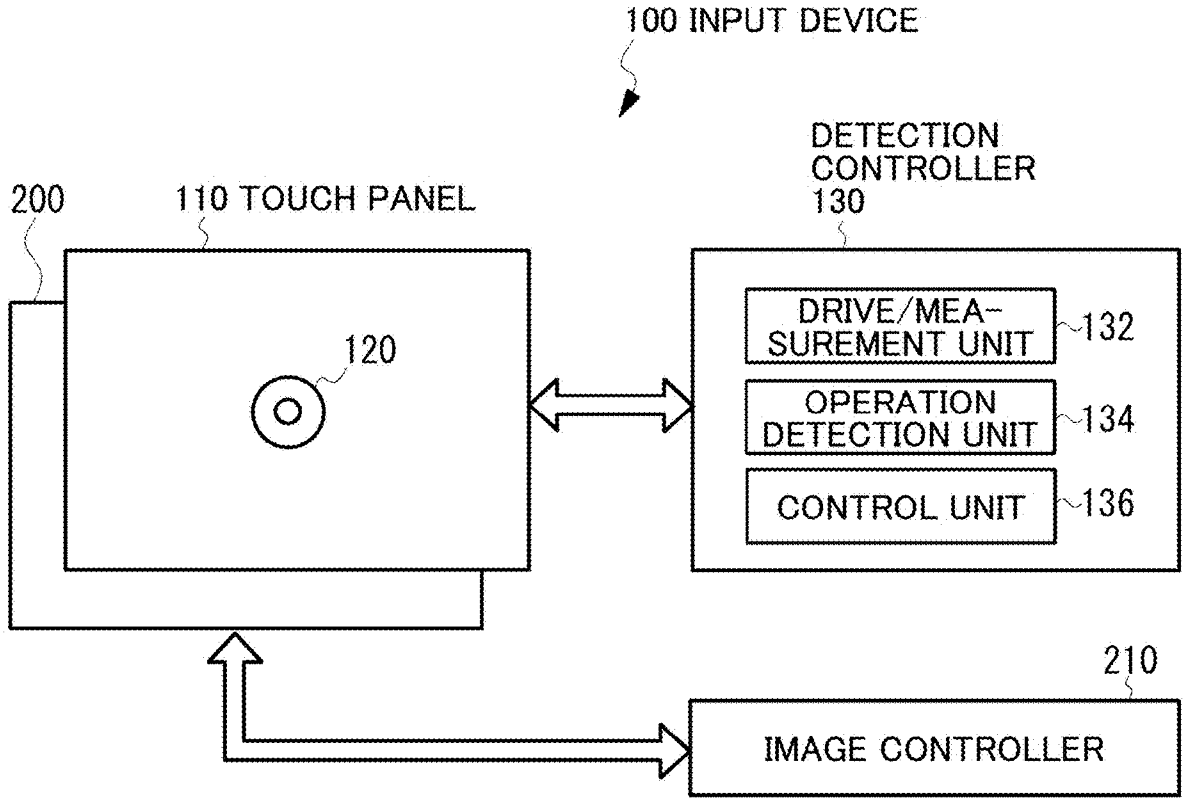
FIG. 7 is a block diagram illustrating a configuration of an input device according to an embodiment of the present invention.

Next, Examples of the present invention will be described in detail. FIG. 7 is a block diagram illustrating the configuration of an input device according to an Example of the present invention. An input device 100 of the present Example includes a capacitance-type touch panel 110, a knob 120 attached to the surface of the touch panel 110, a detection controller 130 for detecting an operation on the touch panel 110 and the knob 120, a display 200, and an image controller 210.

For example, the touch panel 110 includes a plurality of detection sensors formed at locations at which a plurality of X-side and Y-side electrode lines intersect. The detection sensors detect capacitance changes when a user's fingers, hand, or the like approach(es) or touch(es) the touch panel 110. The touch panel 110 is mounted on the display 200 and provides a user input interface to input buttons such as icons displayed on the display 200. The image controller 210 generates images such as icons displayed on the display 200, and, is mounted, for example, in a vehicle-mounted device.

The knob 120 provides a user input interface in cooperation with the touch panel 110. Physical operation information on a user's operation on the knob 120 is expressed as a change in the capacitance of the touch panel 110, and the change in the capacitance is detected.

For example, as illustrated in FIGS. 5A to 6B, the knob 120 is constituted by a doughnut-shaped rotary operating element (rotary encoder). The knob 120 can be attached to a desirable position on the touch panel 110, and, for example, the bottom of the knob 120 is attached to the surface of the touch panel 110 by a double-sided adhesive. The attachment position of the knob 120 is defined by, for example, coordinates of the center of rotation of the knob 120.

The knob 120 includes, for example, a housing made of an insulating material such as plastic. A conductor (for example, the conductor 70 illustrated in FIGS. 5A and 6A) configured to rotate along with the rotation of the knob 120 is provided in the housing or near the surface thereof. The installation method and the installation position of the conductor are optional, but when a user grips the knob 120 with fingers and rotates the knob 120, the conductor also rotates together.

The material, shape, and size of the conductor situated in the knob 120 are optional, but the conductor is capacitively coupled to the detection sensors of the touch panel 110. When the fingers F touch the knob 120 or when the knob 120 is rotated, the capacitances of detection sensors that are capacitively coupled to the conductor change. Furthermore, when the user grips the knob 120 with fingers F, the capacitances of detection sensors that are capacitively coupled to the conductor change in accordance with the number of fingers F in contact with the knob.

The detection controller 130 is electrically connected to the touch panel 110, controls the entire operation of the touch panel 110, and detects a user's operation input into the touch panel 110 or the knob 120. The detection controller 130 is formed by hardware and/or software, and is formed by, for example, a controller including a ROM/a RAM that is equipped with software for controlling the touch panel 110. As illustrated in FIG. 7, the detection controller 130 includes a drive/measurement unit 132, an operation detection unit 134, and a control unit 136.

The drive/measurement unit 132 drives the plurality of electrode lines on either or both of the X-side and the Y-side of the touch panel 110, and measures the capacitance of each detection sensor on the driven electrode line. The operation detection unit 134 detects an operation on the touch panel 110 and an operation on the knob 120 based on the capacitance measured by the drive/measurement unit 132. For example, when the user's fingers F approach or touch the touch panel 110, the operation detection unit 134 detects the touch position based on a change in the capacitance of the corresponding detection sensor. When the user's fingers F touch the knob 120, the capacitance of the detection sensor corresponding to the position of the conductor changes, and the change in the capacitance is detected by the operation detection unit 134. The change in the capacitance when the fingers F touch the knob 120 vary in accordance with the number of the fingers F touching the knob, and the change in the capacitance is detected by the operation detection unit 134. When the knob 120 is further rotated, the position of the conductor changes, and the capacitance of the detection sensor corresponding to the position of the conductor changes. The change in the capacitance is detected by the operation detection unit 134. That is, the operation detection unit 134 detects the touch position on the touch panel 110, a touch on the knob 120, a rotation operation on the knob 120, and the like based on the changes in the capacitance.

The control unit 136 receives the detection result of the operation detection unit 134, and controls the operation of the input device 100 and the image controller 210 in accordance with the detection result.

Figure 8:
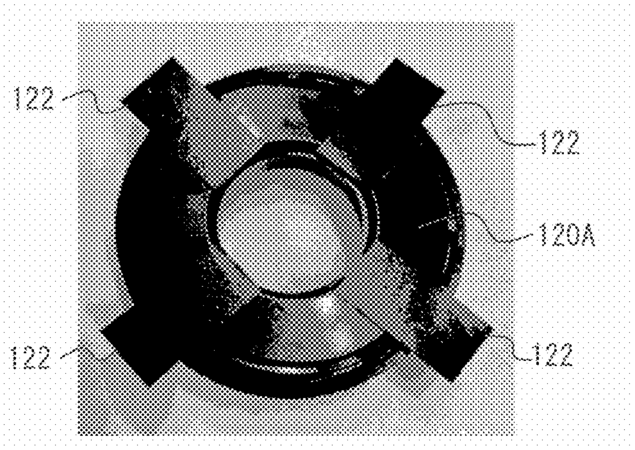
FIG. 8 is a view illustrating an example of providing an insulating tape to a knob according to an embodiment of the present invention.

FIG. 8 illustrates an example in which insulating tapes 122 are pasted as low-permittivity members at four positions on a bottom surface 120A of the knob 120. In this example, the number of steps is four, and the rectangular low-permittivity members are attached radially at equal intervals of 90 degrees.

Figure 9:
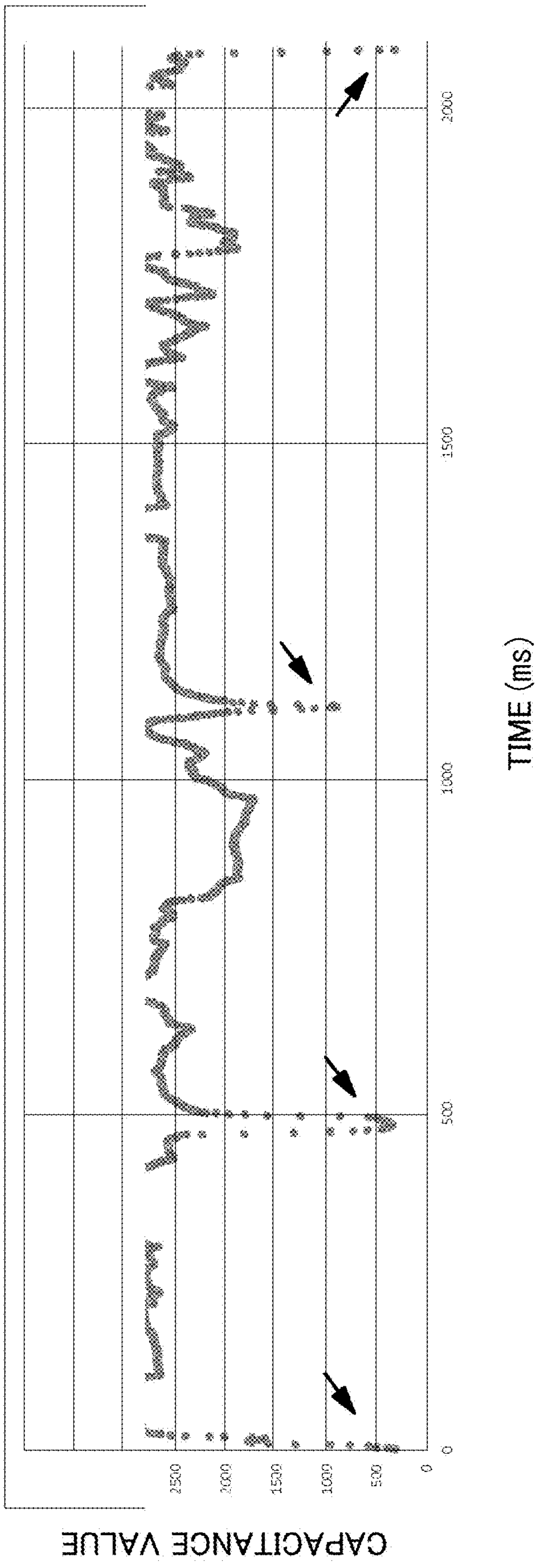
FIG. 9 is a graph illustrating changes in capacitance when the knob of FIG. 8 is rotated.

FIG. 9 illustrates graph data obtained when changes in the capacitance value were observed by using the knob illustrated in FIG. 8 and actually rotating the knob on the touch sensor. The vertical axis represents the capacitance value, and the horizontal axis represents the time (ms). In this example, one conductor is used in the knob.

It can be appreciated that the capacitance value sharply decreases at the points indicated by the arrows in FIG. 9. It can be appreciated that these points are the points of time when the conductor in the knob passes immediately above the insulating tapes 122, and that there is a clear difference in the detected capacitance value depending on the presence or absence of the insulating tapes 122. Using this difference, it is possible to set a threshold value for rotation determination.

At the product assembling, the number and spacing of the tapes are adjusted in accordance with the angle per one step of the knob and the position at which a clicking occurs. During an operation, determination of a rotational move corresponding to one step is performed by observing whether a capacitance value becomes equal to or less than the threshold value. When the insulating tape regions are wide, conversely "whether a capacitance value becomes equal to or more than the threshold value may be observed during the operation".

Figure 10:
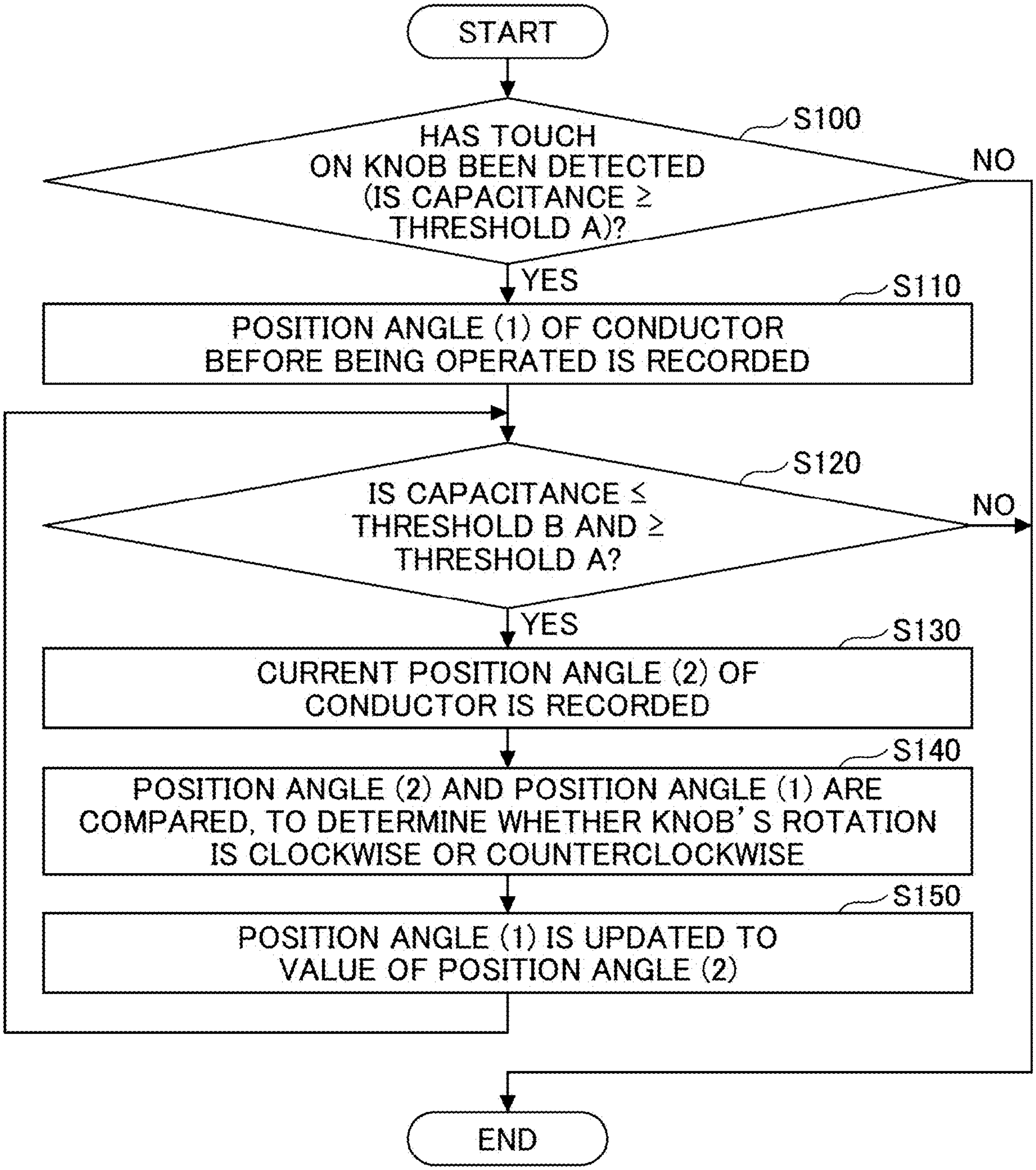
FIG. 10 is a flowchart of an algorithm for detecting a knob rotation operation according to the present embodiment.
Figure 11:
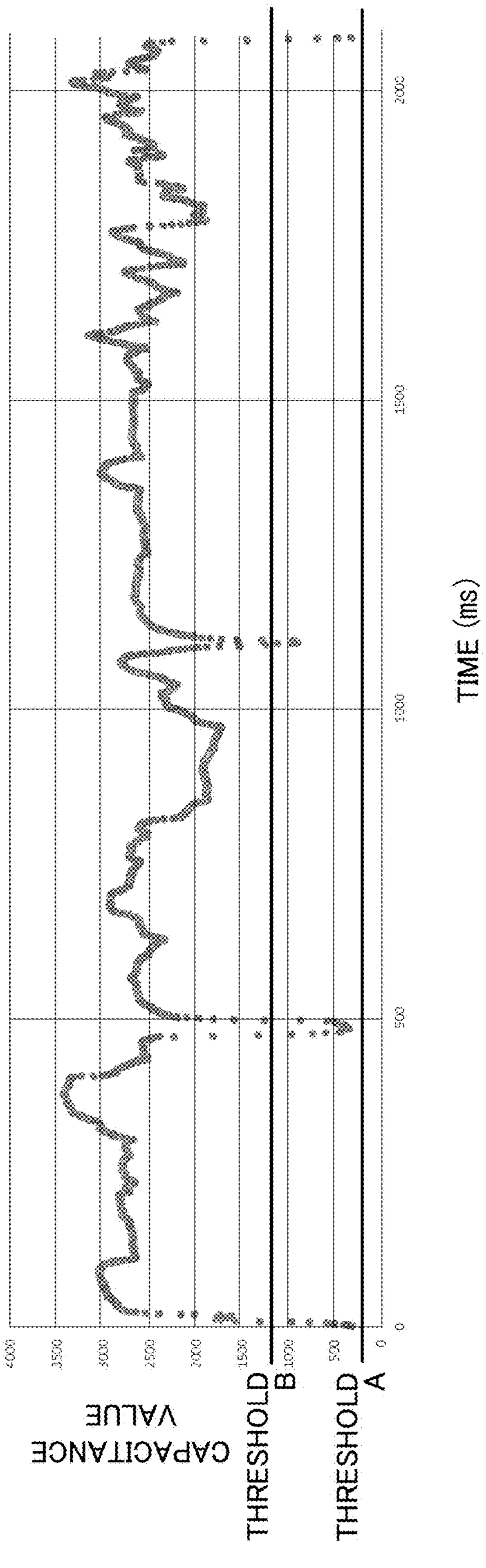
FIG. 11 is a diagram illustrating an example of threshold values that are set for touch determination or the like in the algorithm for detecting a rotation operation.

Next, the flow of the knob rotation operation detection algorithm of this Example is illustrated in FIG. 10. FIG. 11 illustrates an example of threshold values that are set in this detection algorithm. The threshold value A is a threshold value for determining whether the knob has been touched or not, and the threshold value B is a threshold value for determining whether a low-permittivity member provided on the knob has been passed over or not.

First, the operation detection unit 134 detects whether fingers have touched the knob 120 (S100). Specifically, as illustrated in the graph of FIG. 11, a touch is detected when the capacitance is equal to or higher than the threshold value A. Next, the operation detection unit 134 records the position angle (1) of the conductor before being operated (S110). While the user is rotating the knob 120, the capacitance is exceeding the threshold value B while the conductor is passing over a region other than a low-permittivity member, whereas the capacitance is decreasing while the conductor is passing over a low-permittivity member. The operation detection unit 134 determines whether or not the capacitance has decreased to equal to or less than the threshold value B and is equal to or higher than the threshold value A (S120). When the capacitance becomes equal to or less than the threshold value A, it is determined that the user has taken his/her hand off (end of the operation).

When the capacitance is equal to or less than the threshold value B and equal to or higher than the threshold value A, the operation detection unit 134 records the current position angle (2) of the conductor (S130), compares the position angle (2) with the position angle (1) to determine whether the knob is rotated clockwise or counterclockwise (S140), updates the position angle (1) to the value of the position angle (2) (S150), and repeats the process from the step S120.

Figure 12C:
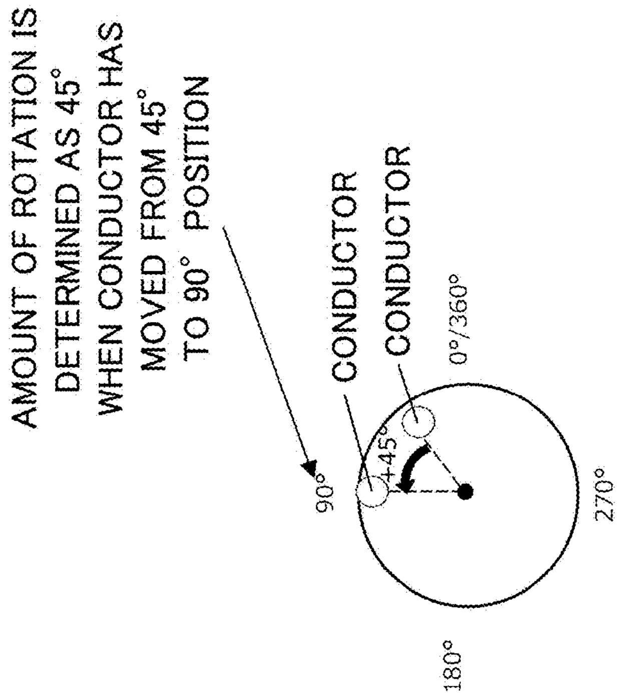
FIG. 12C is a view illustrating an example of an algorithm for detecting a knob rotation angle according to the present embodiment.
Figure 12B:
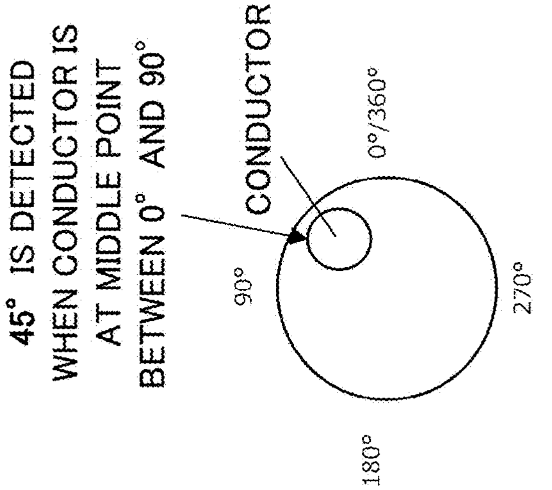
FIG. 12B is a view illustrating an example of an algorithm for detecting a knob rotation angle according to the present embodiment.
Figure 12A:
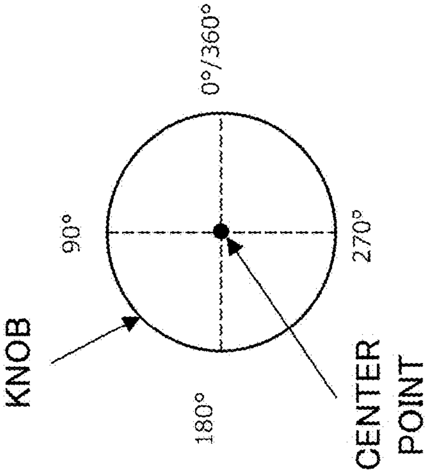
FIG. 12A is a view illustrating an example of an algorithm for detecting a knob rotation angle according to the present embodiment.

FIG. 12 illustrates an example of an algorithm for detecting the rotation angle of the knob. As illustrated in FIG. 12A, a 0-degree position is set as a reference to the coordinates of the center point of the knob. In this example, the right-hand side is set to 0 degrees, and the angle is set to increase counterclockwise. Next, as illustrated in FIG. 12B, the position angle of the conductor provided in the knob is calculated. For example, when the conductor is at the middle point between 0° and 90°, 45° is detected. Next, as illustrated in FIG. 12C, when the position of the conductor is moved from 45° to 90°, the amount of rotation is determined to be 45°.

Thus, according to the present Example, by providing a low-permittivity member or the like on the bottom of the knob for causing a change in the capacitance to be detected in accordance with the number of steps of the knob, that is, the rotation angle to be detected per one rotational move, it is possible to determine the rotation angle of one step of the knob. Therefore, even when the knob is replaced with a knob having a different number of steps, it is unnecessary to renew the settings in the calculation unit. Thus, the convenience of the knob with excellent customizability can be improved.

Although the preferred embodiments of the present invention have been described in detail above, the present invention is not limited to the specific embodiments, and various modifications and changes are applicable within the scope of the spirit of the invention described in the claims.

What is claimed is:

1. An input device, comprising:

a capacitance-type touch sensor;

an operating element rotatably mounted on the touch sensor, the operating element including at least one conductor thereinside, the conductor being able to capacitively couple to the touch sensor and configured to rotate when the operating element is rotated, and the operating element further including:

a fixed part fixed on the touch sensor;

a rotating part rotatably attached to the fixed part via a shaft; and a plurality of capacitance changing parts in a space overlapping a region where the conductor rotationally moves, said capacitance changing parts being provided only on a bottom surface of the fixed part facing the capacitance-type touch sensor; and a detection means configured to detect a rotation angle of the operating element based on a change in capacitance of the capacitance changing parts when the operating element is rotated, wherein the capacitance changing parts are insulating members provided to the operating element.

2. The input device according to claim 1, wherein the plurality of capacitance changing parts are arranged at intervals corresponding to the rotation angle to be detected per one rotational move.

3. The input device according to claim 1, wherein the insulating members are made of a material having a permittivity lower than that of the operating element.

4. The input device according to claim 1, wherein the capacitance changing parts are regions of the operating element that are changed in thickness in a direction toward the touch sensor.

5. The input device according to claim 1, wherein the operating element includes a fixed part fixed on the touch sensor and a rotating part rotatably attached to the fixed part, and the capacitance changing parts are situated on the fixed part.

6. The input device according to claim 1, wherein the plurality of capacitance changing parts protrude from the fixed part in a rotation axis direction of the operating element.

* * * * *